United States Patent [19]

Craighead, II et al.

[11] Patent Number: 4,558,967
[45] Date of Patent: Dec. 17, 1985

[54] JOINT FOR DEPLOYABLE STRUCTURES

[75] Inventors: Norwood D. Craighead, II, Sunnyvale; Richard J. Preliasco; Timothy D. Hult, both of Mountain View, all of Calif.

[73] Assignee: The United States of America as represented by the Administrator, National Aeronautics and Space Administration, Washington, D.C.

[21] Appl. No.: 469,864

[22] Filed: Feb. 25, 1983

[51] Int. Cl.⁴ .............................................. F16C 11/00
[52] U.S. Cl. .................................... 403/113; 403/120; 16/294
[58] Field of Search ................ 403/120, 113, 111, 53, 403/54; 16/370, 294, 369; 244/49

[56] References Cited

U.S. PATENT DOCUMENTS

| | | | |
|---|---|---|---|
| 1,030,936 | 7/1912 | Soss | 16/369 |
| 1,108,308 | 8/1914 | Zuckerman | 16/369 |
| 2,289,224 | 2/1940 | Swanson et al. | 244/49 |
| 2,468,425 | 4/1949 | Carpenter et al. | 244/49 X |
| 2,599,834 | 12/1949 | Jenkins | 16/370 |
| 2,854,261 | 9/1958 | Spaide | 403/53 |
| 3,063,660 | 7/1960 | Jarrell | 244/49 |
| 4,230,295 | 10/1980 | Eppler | 16/370 X |

Primary Examiner—Andrew V. Kundrat
Attorney, Agent, or Firm—Paul F. McCaul; John R. Manning; Thomas H. Jones

[57] ABSTRACT

A joint (10) is described for connecting a pair of beams to pivot them between positions in alignment or beside one another, which is of light weight and which operates in a controlled manner. The joint includes a pair of fittings (16, 18), and at least one center link (20) having opposite ends pivotally connected to opposite fittings and having axes (36, 38) that pass through centerplanes (36, 38) of the fittings. A control link (24) having opposite ends pivotally connected to the different fittings controls their relative orientations, and a toggle assembly (26) holds the fittings in the deployed configuration wherein they are aligned. The fittings have stops (28, 30) that lie on one side of the centerplane opposite the toggle assembly.

9 Claims, 7 Drawing Figures

JOINT FOR DEPLOYABLE STRUCTURES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Large space platforms and other structures can be constructed of multiple beams that are joined by precision joints, to permit folding of the structures to a stowed position for transport in the Space Shuttle or other vehicle. The joint that connects a pair of beams should enable pivoting about an axis that passes substantially through the axes of the aligned beams, to avoid slight elongation of the beam structure as it is moved from the deployed to the stowed configuration. Precision alignment and unnecessary motion requires avoidance of backlash in the joint. A light weight joint which provided precision joining and controlled pivoting of beams would be of considerable value in the construction of structures for outer-space and other applications.

SUMMARY OF THE INVENTION

In accordance with one embodiment of the present invention, a joint is provided for connecting a pair of beams or other structures, which is of light weight and which enables precision control of the relative positions of the structures. The joint includes a pair of fittings connected to the ends of beams or the like, and at least one center link having opposite ends pivotally connected to the fittings at pivot axis lying on the center planes of the fittings. A control link can be used to control the orientation of the fittings. The opposite ends of the control link are pivotally mounted on the fittings, with one control link axis lying above the centerplane of one fitting and below the center plane of the other fitting. A toggle assembly can be used to hold the fittings in either deployed or stowed positions wherein the fittings lie respectively in line or beside one another. The toggle assembly can include a pair of bars having inner ends pivotally mounted on the fittings and outer ends pivotally connected together, and can include a spring that urges one of the bars to pivot.

The novel features of the invention are set forth with particularly in the appended claims. The invention will be best understood from the following description when read in conjunction with the accompanying drawings.

DESCRIPTION OF THE PREFERRED EMBODIMENT

Figure 1:
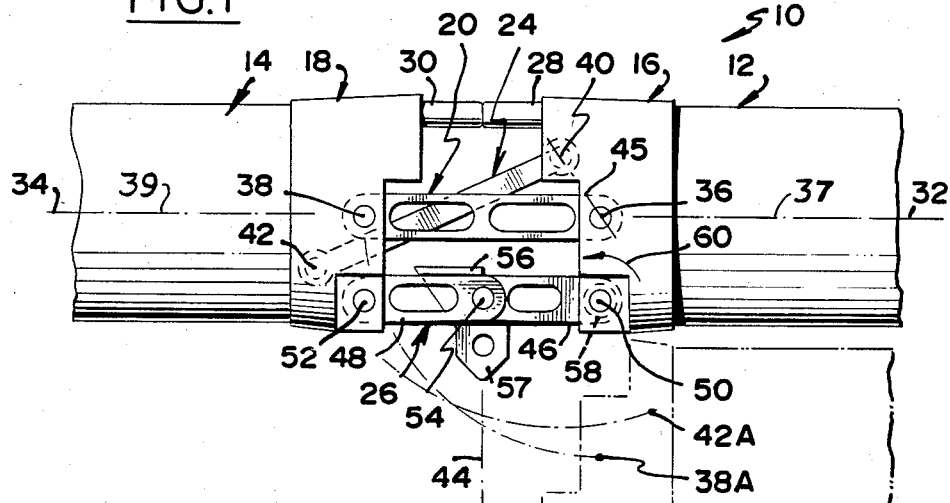
FIG. 1 is a side elevation view of a joint constructed in accordance with the present invention, shown in a deployed configuration.

FIG. 1 illustrates a joint 10 of the present invention, which is used to connect a pair of beams 12, 14 and stably hold them in either the deployed position shown in solid lines or the stowed position shown in phantom lines. The joint includes a pair of fittings 16, 18 rigidly fixed to the ends of the beams and coupled together by various links and bars. The coupling system includes a pair of center links including link 20 for holding the fittings together while permitting them to pivot, and a control link 24 that controls the relative orientations of the fittings at both the deployed and stowed positions. A toggle assembly 26 serves to forcibly hold or retain the fittings in each of their two main positions, the deployed and stowed positions, while a pair of stops 28, 30 limit the relative pivoting of the fittings toward their deployed position.

Figure 5:
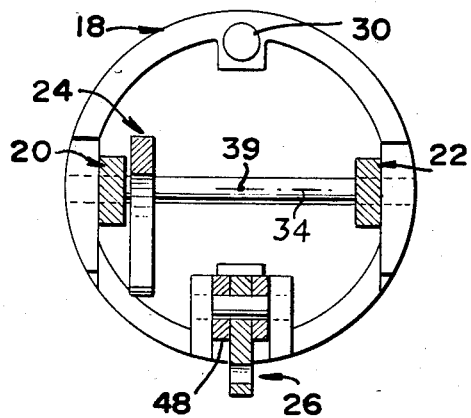
FIG. 5 is a view taken on the line 5—5 of FIG. 4.
Figure 6:
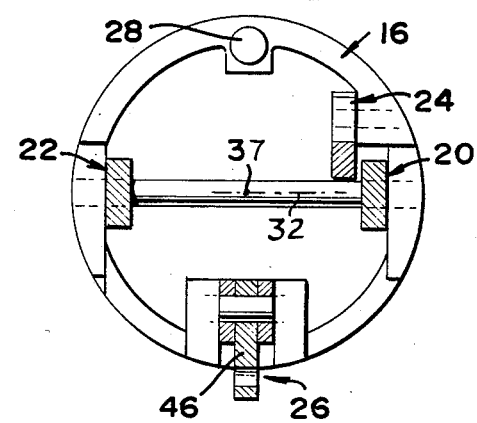
FIG. 6 is a view taken on the line 6—6 of FIG. 4.

Each of the fittings 16, 18 has a centerplane 32, 34 as can also be seen in FIGS. 5 and 6, and also has an axis 37, 39 lying on the centerplane. When the fittings are in the deployed configuration of FIG. 1, the centerplanes 32, 34 of the fittings are substantially coincident. When the fittings are turned 180° relative to one another to the configuration shown in FIG. 3, the centerplanes of the fittings are parallel (i.e. when viewed along their edges they appear parallel). However, the centerplanes are then spaced apart by a distance A approximately equal to the width of each fitting.

The center links such as 20 (FIG. 1) each have opposite ends pivotally mounted about center link axis 36, 38 that lie substantially in the centerplanes 32, 34 of the fittings and extend perpendicular to the fittings axes 37, 39. While the center links allow the fittings to pivot between the deployed and stowed configurations, they do not control the relative orientation of the fittings. Such control is necessary to assure that the beam 14 is aligned with the other beam 12 in the deployed configuration, and is parallel but spaced from the beam 12 in the stowed configuration. The control link 24 controls the orientation of the fittings.

The control link 24 has opposite ends pivotally mounted about axes 40, 42 that extend parallel to the center link axes, but which are displaced therefrom. The control axes 40, 42 are positioned so that in the deployed configuration of FIG. 1 wherein the centerplanes are substantially coincident, one control axis 40 lies on one side of the centerplanes while the other control axis 42 lies on the opposite side of the centerplanes. Also, one control axis 40 lies closer than the other to an intersection axis 44 that lies half-way between the fittings in the deployed configuration and that is perpendicular to the axes 37, 39. Each control axis such as 40 lies on an imaginary line 45 that extends at 45° to the centerplane 32 and passes through the corresponding center link axis 36. The control axes 40, 42 lie at the same distance from their center link axes 36, 38. This relative positioning of the center link and control link axes, causes one fitting such as 18 to rotate 180° to the orientation shown at 18A, when the center link axis 38 on the fitting 18 pivots by 90° about the other, from the position 38 in FIG. 1 to the position 38A. During such movement, the control axis 42 on the fitting 18 turns about the other control axis 40 to end up at the position 42A. It would be possible to assure the same result, of forcing the link 18 to rotate about the center axis 38 thereon by twice its angle of rotation about the center link axis 36, by other means. For example, two gears can be used that mesh with one another and that are respectively fixed to the two fittings 16, 18. However, such gears would add considerably more weight than the relatively simple control link 24.

The toggle assembly 26 (FIG. 1) includes two toggle bars 46, 48 that each have an inner end mounted at axes 50, 52 on the fittings 16, 18, and which end have an outer end pivotally connected at 54 to the other bar. A stop 56 on one of the bars prevents the bars from moving beyond a position of near alignment in the deployed configuration of FIG. 1. In fact, the stop prevents the bars from moving past a position wherein they are slightly out of alignment. A handle 57 is formed on one of the bars 46 to facilitate moving the fittings to their stowed and deployed configurations. A spring 58 is connected to one of the toggle bars 46 to urge it to rotate in the direction of arrow 60 about its toggle axis 50.

The toggle spring 58 serves to hold the joint in either its deployed or stowed configurations when the joint has been forced to either of these configurations. In the deployed configuration of FIG. 1, the lengths of the bars (as represented by imaginary lines passing through their axes of pivoting such as 50, 54 or 52, 54) are a small angle of more than 1°, such as about 2° out of alignment. In alignment, a first of such imaginary lines passing through axes 50 and 54, would be parallel (and coincident in a side elevation view) with a second imaginary line passing through axes 52, 54. They should be less than about 10° away from alignment to provide a large holding capability. The torque applied by the spring 58 which then urges the bars toward alignment, thereby urges the fittings to remain in the deployed configuration. The force of the spring 58 urging the toggle bars into alignment, and the stop 56 that prevents such movement, causes the shafts at the axes 50, 52 to be pushed away from one another. This prevents backlash in the joint that could allow slight unrestrained movmement or "rattling" of the fittings and beams, which would be undesirable.

Figure 2:
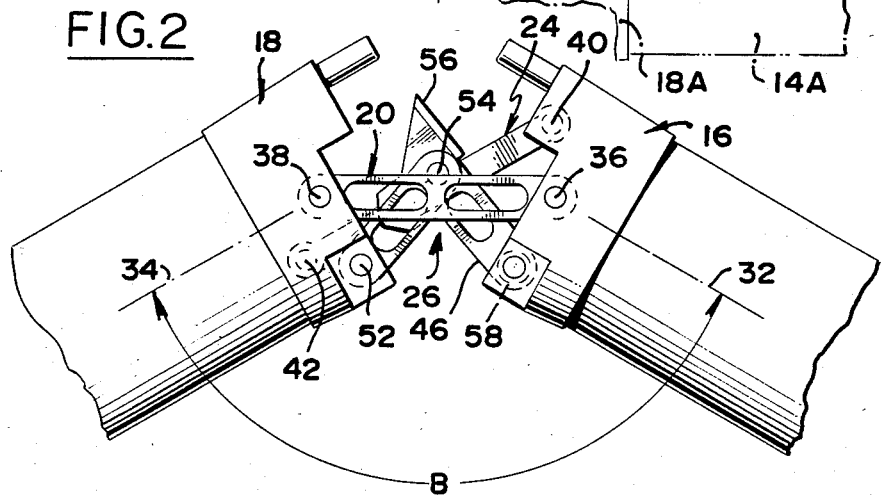
FIG. 2 is a view similar to FIG. 1, but showing the joint partially stowed.
Figure 3:
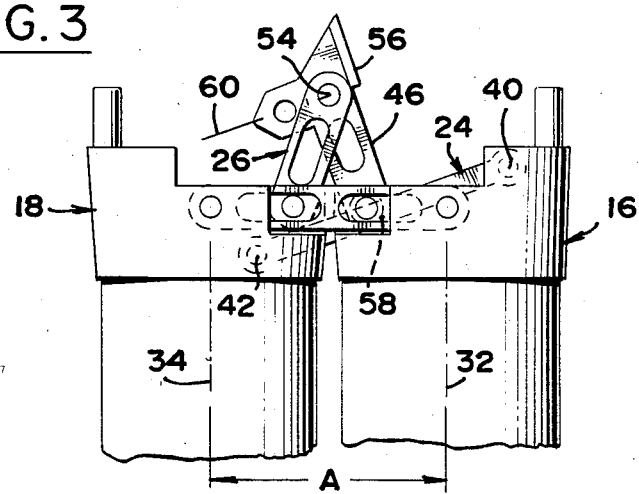
FIG. 3 is a view similar to FIG. 1, but showing the joint in a fully stowed position.
Figure 4:
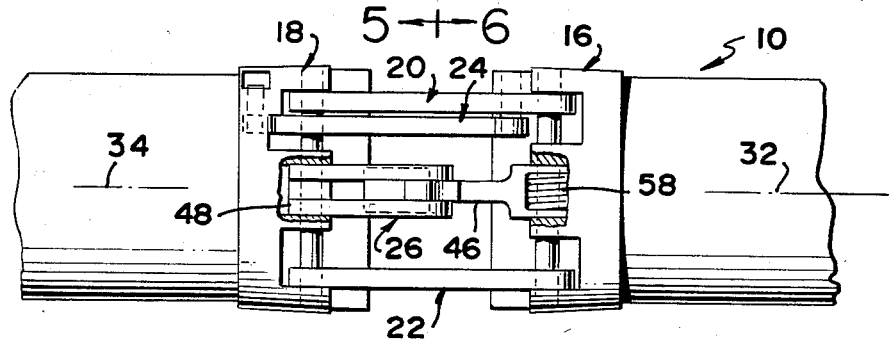
FIG. 4 is a bottom view of the joint of FIG. 1, with a portion thereof broken away.
Figure 7:
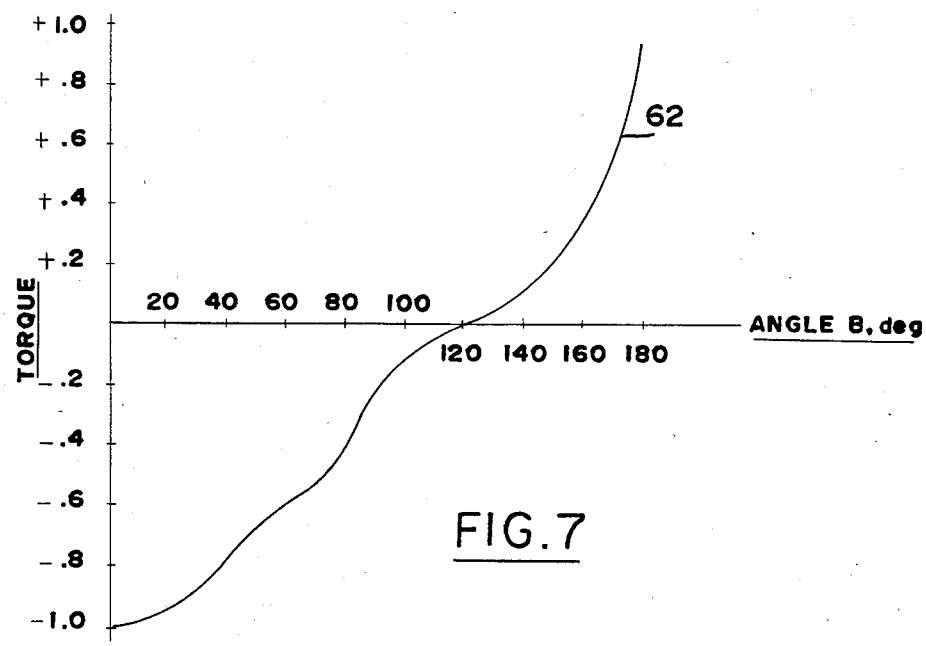
FIG. 7 is a graph showing variation of torque amplitude and direction, with variation of the angle of the fittings of FIG. 2.

When the joint is moved towards the stowed position, by a force that overcomes the force of the spring 58, the joint passes through the orientation shown in FIG. 2, and achieves the orientation shown in FIG. 3. In the orientation in FIG. 3, the spring 58 urges the outer toggle bar axis 54 of the bar 46 in the the direction of arrow 60. This direction of force applied to the bar 48, urges the fitting 18 to rotate counterclockwise to keep it in the stowed position. As the joint moves from the stowed position of FIG. 3 towards the deployed position, and passes through the orientation of FIG. 2, the direction of torque applied to the fitting 18 relative to the other one changes, so that the spring 58 begins to apply a torque that urges the fitting 18 to rotate clockwise, instead of counterclockwise. Thus, as the joint approaches the deployed position the spring 58 urges it toward the deployed position, and as the joint approaches the stowed position the spring 58 urges it toward the stowed position. For a joint of the construction illustrated, the neutral position at which the spring 58 does not apply a torque, occurs at an angle B between the center lines or axes of the fittings, of about 120°. A joint has been constructed of the type illustrated in the figures, and tests showed that the torque applied by the spring varied in the manner shown by graph 62 in FIG. 7. The graph 62 shows the percentage torque applied at various angles B of the fittings. It can be seen that the cross-over between counterclockwise and clockwise torque, occur at an angle B of about 120°.

Thus, the invention provides a joint for connecting a pair of deployable structures such as beams, which is of light weight, which pivots the structures about axes passing through their centerplanes, which closely controls the orientation of the structures as to rotate them by 180° when they are moved in a 90° arc relative to one another, which avoids backlash, and which biases the joint toward either of two extreme positions which it can assume. The joint includes a pair of fittings, and a pair of center links having opposite ends pivotally connected to the fittings at their centerplanes. A control link with axes displaced from those of the center link, controls orientation of the fittings as they pivot. A toggle assembly includes bars that can substantially lock the fitting in the deployed position, and includes a spring coupled to one of the bars to pivot it.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A joint for connecting a pair of deployable structures comprising:

a pair of fittings for connecting to the ends of beams that are to be pivotally connected, each fitting having a centerplane, and said centerplanes lying substantially coincident when the fittings are in a deployed position and lying spaced but substantially parallel when the fittings are in a stowed position, each of said fittings having first and second sides on opposite sides of its centerplane, and said first sides of both fittings lying on the same side of both centerplanes when the fittings are in said deployed position;

a center link having opposite ends pivotally connected to first and second of said fittings at axes that each lie substantially on the centerplane of the corresponding fitting; and a toggle assembly which included first and second toggle bars that each have an inner end pivotally mounted about an inner axis on a different one of said fittings and an outer end pivotally connected about an outer axis to the outer end of the other bar, the inner pivot axes of said bars both lying on the first sides of said centerplanes, said bars constructed so when the fittings are deployed, imaginary lines connecting the two pivot axes of each bar are angled by less than 10° from alignment.

2. The joint described in claim 1 wherein:

said toggle assembly includes a spring coupled to one of said bars, that urges that bar to pivot about the pivot axis at its inner end, in a direction that urges the bars toward alignment when they are within 10° of alignment, the term alignment denoting the condition wherein said imaginary lines were parallel.

3. The joint described in claim 1 including:

a control link having opposite ends pivotally connected to different ones of said fittings, one end of said control link pivotally connected to one of said fittings on the first side of the centerplane thereof, and the other end of said control link pivotally connected to the other fitting on the second side of the centerplane thereof.

4. The joint described in claim 3 wherein:

the pivot axis at each end of said control link is spaced the same distance from its corresponding center link axis, and lies on an imaginary line that is angled about 45° from the centerplane of the corresponding fitting and that passes through the corresponding center link axis.

5. The joint described in claim 1 wherein:

the length of said center link as measured between the axes of pivoting at its opposite ends, is substantially equal to the maximum width of each fitting as measured perpendicular to its centerplane, whereby the fittings lie closely beside each other in the stowed position.

6. A joint for connecting a pair of deployable structures comprising:

first and second fittings, each having an imaginary centerplane and an imaginary fitting axis lying in said centerplane;

at least one center link having first and second ends pivotally mounted respectively on said first and second fittings about first and second link axes, each link axis lying substantially in the centerplane of the corresponding fitting;

said fittings being pivotable about said center link axes between a deployed position wherein said centerplanes are substantially coincident, and a stowed position wherein said centerplanes are substantially parallel but spaced apart; and a control link having opposite ends pivotally connected to different ones of said fittings, each end of the control link connected to a fitting about a control axis extending parallel to the corresponding center link axis, and the control axes at said opposite ends of said control link positioned so they lie on opposite sides of said substantially coincident centerplanes when the fittings are in the deployed position.

7. The joint described in claim 6 wherein:

each of said control axes is located on an imaginary line extending about 45° to the corresponding centerplane and extending through the corresponding center link axis, one of said control axes being located closer to the opposite fitting than the corresponding center link axis, and the other control axis located further from the opposite fitting than the corresponding center link axis.

8. In a joint which includes a pair of fittings having centerplanes, and a center link having opposite ends pivotally mounted on corresponding fittings substantially on their centerplanes, the improvement comprising; a pair of toggle bass, each having an inner end pivotally mounted on a different one of said fittings at a distance from the centerplane thereof, and an outer end pivotally connected to the other bar; and a spring connected between one of said bars and the corresponding fitting, for urging said one bar to pivot in a direction that urges the outer end of said bar away from the centerplane of the corresponding fitting when the bars are close to an alignment orientation wherein a first imaginary line passing through the pivot axes at opposite ends of a first bar is parallel to a second imaginary line passing through the pivot axes at opposite ends of a second of said bars.

9. The improvement described in claim 8 including:

means for limiting relative movement of said bars so they cannot move closer to alignment than an orientation wherein they are at least 1° out of alignment.

* * * * *